United States Patent [19]
Wubbe

[11] 3,849,829
[45] Nov. 26, 1974

[54] STRAIGHT END ARM CONNECTOR

[76] Inventor: Leo J. Wubbe, Beverly Shores, Ind.

[22] Filed: Oct. 26, 1972

[21] Appl. No.: 294,819

[52] U.S. Cl. .................................... 15/250.32
[51] Int. Cl. ............................................ B60s 1/40
[58] Field of Search........ 15/250.32, 250.36, 250.42

[56] References Cited
UNITED STATES PATENTS

| | | | |
|---|---|---|---|
| 3,023,446 | 3/1962 | Prohaska | 15/250.32 |
| 3,071,797 | 1/1963 | Zury | 15/250.32 |
| 3,621,507 | 11/1971 | Allaria et al. | 15/250.32 |

*Primary Examiner*—Peter Feldman
*Attorney, Agent, or Firm*—Axel A. Hofgren et al.

[57] ABSTRACT

A connector is provided for attaching a straight end windshield wiper arm having a raised lug in the end portion thereof to a windshield wiper blade. The connector is preferably made of a plastic material and is pivotally secured to the wiper blade. The connector has an opening into which the end of the arm extends. The outer end portion of a shaped and apertured flat spring member is secured in the opening in the connector with the opposite end portion of the spring member being urged downwardly against a bottom wall of the connector. The lug on the end of the arm is urged into nesting relation in the aperture in the spring with the end of the arm resiliently urged against the bottom wall of the connector. To remove the arm from the connector, the arm is pivoted about the front edge of the bottom wall so as to disconnect the lug from the opening in the spring. Once the lug clears the spring, the arm is pulled straight out of the connector.

8 Claims, 5 Drawing Figures

STRAIGHT END ARM CONNECTOR

FIELD OF THE INVENTION

This invention relates to windshield wiper blade connectors and more particularly, to an improved and simplified retaining means in a connector for securing a straight end arm to a blade.

BACKGROUND OF THE INVENTION

Many different connectors are available for connecting various types of windshield wiper arms to a windshield wiper blade. One of the popular windshield wiper arms is called a "straight end" arm and is one on which the end portion remote from the pivot mounting of the arm has a straight and planar configuration with a raised lug or dimple projecting upwardly from central part of said end portion. A windshield wiper blade that is to be connected with said straight end arm is provided with a connector pivotally mounted on said blade and is of such a construction that the wiper arm can be inserted therein and become attached to said connector by a latching arrangement in said connector.

Current connectors for use with the straight end arms have complex spring arrangements that are shaped and positioned in the connector housing so as to guide the arm end into a proper position, whereupon the spring latches the arm to the blade. The springs in the current connectors are held in place by rivets or pins which pass through a wall or walls of the connector into securing position with the spring. In addition to being relatively expensive, the current connectors have weaknesses which have resulted in failure whereby the blade flys off leaving the arm reciprocating across the windshield and scratching the surface of said windshield. In addition, with the blade gone, the windshield becomes obstructed and the driver becomes unable to see the road with the attendant complications. It is readily apparent that even a failure rate of one out of a million cars is too high since that one failure can have catastrophic effects both on the car owner and on the business of the windshield wiper blade manufacturer.

An analysis of the current connector failures reveals that generally, the spring breaks either where it is shaped around a sharp bend or where the combined effect of punching the rivet hole and the work hardening of the spring around said rivet hole caused by setting the rivet in said hole creates a weakness. The weak part of the spring either in the vicinity of the sharp bend or in the vicinity of the work hardened portions adjacent the rivet becomes fatigued under the repeated flexings of the spring and occasionally fails with the results pointed out above.

SUMMARY OF THE INVENTION

The invention of the present application is directed to a straight end arm connector of relatively inexpensive and simple construction which has substantially eliminated the fatigue failure problems of the current connectors. The new connector includes a relatively flat spring member held in position in a pair of internal mounting grooves in such a way that the straight end arm is positively engaged and locked on the connector and is held thereon without failure until it is affirmatively removed by an appropriate but simple disconnect motion. What small shaping of the spring is necessary is limited to between a few degrees and up to about 45° which is insufficient to localize the start of a fatigue failure point. The biggest bend in the spring is a right angle bend at the one end of the spring remote from the wiper arm. The right angled end of the spring serves as an abutment surface for locating the latching elements of the arm and spring and is such that even if the spring ruptures at the right angle bend, it will not release the latching arrangement and in fact, the connector is still usable and functional without the right angled abutting end.

The one end of the spring near the open end of the connector is upturned slightly so as to abut in a recess in the connector housing to prevent the spring from working out of the connector. The end of the spring beyond the end of the mounting grooves is urged downwardly to force the abutting end of the spring against the inside bottom wall of the connector. A straight end arm urged into the open end of the connector will urge the abutting end of the spring away from the bottom wall and will force the lug on the arm into nesting relation in the aperture in the spring of the connector. To remove the arm, the arm and connector are pivoted one relative to the other so as to deflect the abutting end of the spring upward as the arm pivots about the leading edge of the bottom wall of the connector until the lug disengages from the aperture in the spring whereupon the connector can be moved away from the arm for disconnecting one from the other.

Further features and advantages of the invention will be apparent from the following description and from the drawings, in which.

DESCRIPTION OF A PREFERRED EMBODIMENT

Figure 1:
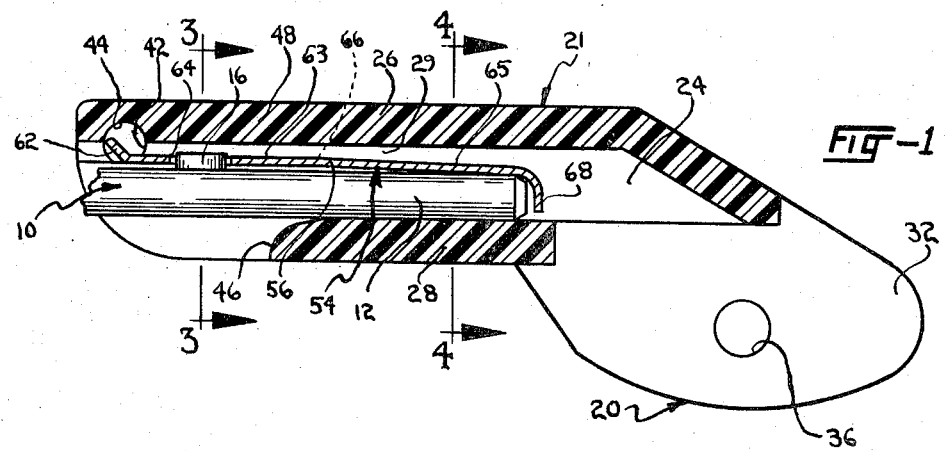
FIG. 1 is a longitudinal section taken through one of my improved connectors and showing a portion of a straight end windshield wiper arm latched in position therein.
Figure 2:
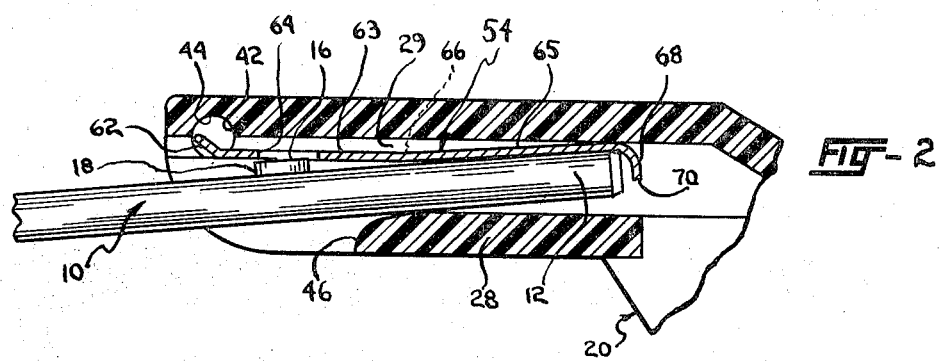
FIG. 2 is a longitudinal section view similar to FIG. 1 only showing the windshield wiper arm tilted into an unlatching position relative to the connector.
Figure 3:
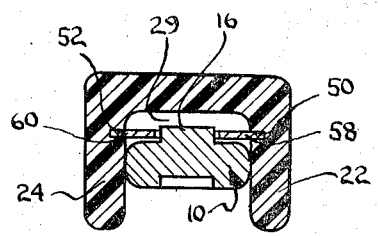
FIG. 3 is a transverse cross-sectional view taken along the line 3—3 of FIG. 1.
Figure 4:
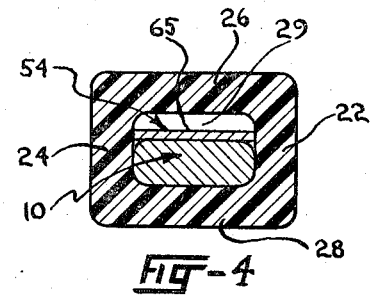
FIG. 4 is a transverse cross-sectional view taken along the line 4—4 of FIG. 1.

Referring more particularly to the drawings wherein like reference numerals refer to like parts throughout, it will be noted that a straight end windshield wiper arm 10 is provided at the end portion 12 with an upstanding lug or projection 16. The lug or projection 16 is illustrated in the form of a cylinder with walls 18 lying substantially perpendicular to the plane of said end portion 12. The walls 18 of the lug 16 should be substantially perpendicular to the plane of the end portion 12 to provide a maximum retaining force when engaged with a connector 20 pivotally mounted on a windshield wiper blade (not shown).

The connector 20, as shown, is made of a plastic material, which material can be any one of the relatively hard materials, such as glass-filled nylon, polycarbonate or the like, and can be formed by molding or by a comparable process. The connector could be made of metal or other suitable materials. The connector 20 is comprised of a housing 21 which has a pair of parallel side walls 22, 24, each connected to a top wall 26 and a bottom wall 28 to define an opening 29 therebetween. The enlarged rear end portions 30, 32, respectively, of the sides 22, 24, have aligned openings 34, 36, for positively receiving and retaining opposite end portions of a pin 38. The pin 38 passes through the superstructure of a windshield wiper blade so as to permit the connector 20 to pivot in a plane perpendicular to the axis of the pin 38.

The parallel side walls 22, 24, of the connector, have aligned openings 40, 42, formed therein with the upper part of the openings 40, 42, overlapping the inside of the top wall 26 such that in making the openings 40, 42, a segment of a circle defining a recess 44, is cut into said inside of the top wall to form a rearwardly facing abutting surface in said top wall. The bottom wall 28 joined to the side walls 22 and 24 is of relatively short longitudinal extent having a forward or leading edge 46 which is shown slightly tapered and rounded on the interior thereof. The leading edge 46 of the bottom wall 28 is spaced inwardly from the front edge of the top wall 26 such that the top wall has a portion 48 overhanging forwardly of the leading edge 46.

A pair of inwardly open and aligned grooves 50, 52, are formed in the inside of the side walls 22, 24, respectively, and extend from the front edges of the side walls to end walls 53, 55, at a point slightly rearward of and overlapping the bottom wall 28.

Figure 5:
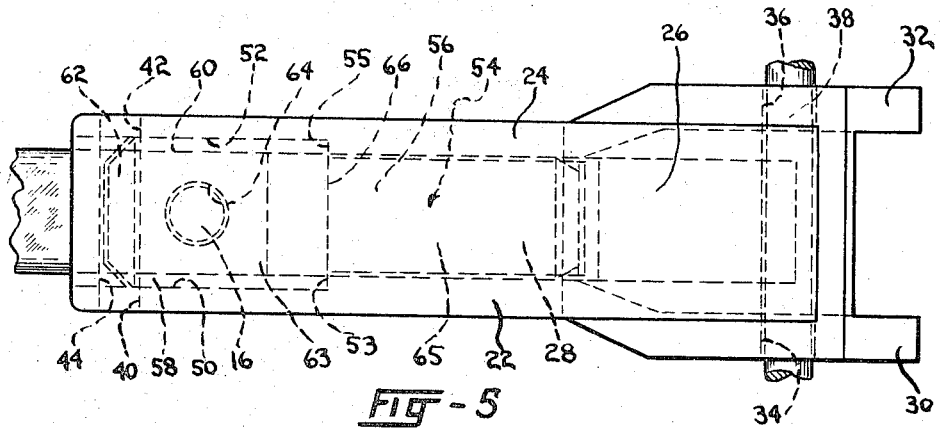
FIG. 5 is a top plan view of the connector of FIG. 1 with parts shown in phantom.

A relatively flat leaf spring 54 is assembled in the interior of the connector housing 21 so as to resiliently latch and retain the wiper arm 10 in connected relation to the connector and blade (not shown). The spring 54 is made of appropriate spring stock and has a body portion 56 generally rectangular in planar view with an anchoring or forward end portion 62, an attaching portion 63, a retaining portion 65 and a downturned end portion 68. As best shown in FIG. 5, a pair of sidwardly or laterally projecting mounting wings or ears 58, 60, extend longitudinally part way down each side of the said attaching portion 63, and, when the spring 54 is assembled in the housing 21, the ears 58, 60, seat in the respective grooves 50, 52, with an interference fit and the rear edges of the ears 58, 60, abut the end walls 53, 55, of the grooves 50, 52. The anchoring or forward end portion 62 of the spring 54 is bent or shaped upwardly approximately at a 45° angle with respect to the plane of the spring and said end portion 62 snaps into said recess 44 in the interior of the top wall against the rearwardly facing abutting surface which in turn forces the ears 58, 60, on the attaching portion against the end walls 53, 55, of the grooves 50, 52, so that the spring 54 is prevented from working forward out of the grooves 50, 52, in the housing. Spaced slightly rearward of the bend for the anchoring or end portion 62 and in the approximate center of the attaching portion 63 of the spring 54 is formed a latching aperture or hole 64 therethrough. Said aperture or hole 64 is slightly larger in diameter than the exterior diameter of the lug 16 on the arm 10. The lug 16 on the arm is adapted to snap into and nest in said aperture 64 for locking said arm to said connector and blade.

The retaining portion 65 of said spring 54 is slightly narrower in width than the spacing between the inside of the side walls 22, 24, and is shaped with a slight downward bend along a transverse line 66. The remote or downturned end portion 68 of the spring is disposed at a right angle to the retaining portion 65 of the spring with the end 70 urged against the inside surface of the bottom wall 28. The end 12 of the wiper arm 10 is threaded into the open end of the connector 20 and between the retaining portion 65 of the spring 54 and the inside surface of the bottom wall 28 until the end 12 approaches the downturned portion 68 of the spring. The lug 16 on the arm will register with the aperture 64 in the spring whereupon the arm 10 will be latched or locked to the connector 20, and incidentally to the wiper blade (not shown).

To remove or disconnect the wiper arm 10 from the connector 20, the arm is pivoted downward with respect to the connector about the leading edge 46 of the bottom wall 28 until the lug 16 disengages from the walls of the aperture 64 in the spring 54. Once the top surface of the lug 16 is out of the bottom plane of the spring 54, the arm end 12 is moved away from the connector until one is clear of the other. During the disconnect pivoting of the arm relative to the connector, the spring 54 is flexed about the bend line 66 so as to move the retaining portion 65 and downturned end portion 68 farther from the surface of the bottom wall 28. The spring tension normally urges the retaining portion 65 downward against the arm end 12 to normally hold the arm end against the inner surface of the bottom wall 28.

It is believed to be apparent that the relatively flat spring 54 is not likely to have any weakened areas due to reverse bending of the spring stock. Likewise, since the aperture 64 is in the sidewardly supported section of the spring, the likelihood of fatigue failure due to flexing at the weakened part of the spring caused by the removal of material of said spring is eliminated.

The upturned anchoring portion 62 is seated in the recess 44 so that the end of the spring urges against the rearward facing abutting surface or wall of the recess to prevent the spring from working forward out of the housing. Due to the positive retention of the spring in the housing, it is not necessary to rivet or pin the spring in the housing which further simplifies assembly, eliminates parts, and thereby reduces costs of the device while at the same time providing an improved substantially fail proof connector.

The spring 54 could be formed with a slight V-shaped effect between the bend or transverse line 66 and the end portion 68 which would apply force to the end of the arm 12 inboard from said end portion 68 so as to increase the amount of force needed to pivot the arm about the edge 46 in releasing the lug 16 from the aperture 64.

It will, of course, be understood that various details of construction may be varied through a wide range without departing from the principles of this invention, and it is, therefore, not the purpose to limit the patent granted herein otherwise than necessitated by the scope of the appended claims.

I claim:

1. A connector for a windshield wiper arm comprising a housing having an open end portion, an elongate spring means in said housing in alignment with said open end portion, said spring means having an anchoring portion, an attaching portion, and a retaining portion, said anchoring portion engaging the inside surface of said housing for preventing forward movement of said spring means, said attaching portion being secured in opposite side walls of said housing with the retaining portion being spring-urged toward the opposite inside surface of said housing, said spring means having an opening formed in said attaching portion and adapted to receive an abutment on an end portion of said windshield wiper arm, and said retaining portion of the spring means urging the end portion of the arm against said opposite inside surface of said housing whereby the wiper arm is positively connected to said connector.

2. In the connector of claim 1 wherein said anchoring portion of said spring means abuts against a rearwardly facing surface in said inside surface of the housing for holding said spring means assembled in the housing.

3. In the connector of claim 2 wherein said attaching portion of said spring means comprises a pair of oppositely projecting ears and said opposite side walls of the housing have aligned grooves formed therein into which said ears seat, said anchoring portion of the spring means urging said ears against a shoulder in each groove for preventing rearward or forward movement of said spring means relative to the housing.

4. In the connector of claim 1 wherein said spring means has a downturned end portion on the retaining portion which is resiliently urged against the opposite inside surface of the housing, said downturned portion serving to maintain a load on said spring means and acting as an abutment for limiting the inward advance of the arm end during assembly of the connector with the wiper arm.

5. In the connector of claim 1 wherein said housing has a top wall projecting beyond the leading edge of the bottom wall, said anchoring portion of the spring means bears against a reverse facing abutment on the overhanging inside surface of said top wall, and said arm is removed from said connector by urging the arm against the leading edge of the bottom wall to pivot the connector relative to the arm to disconnect said abutment on the arm from the opening in said spring means as the retaining portion of the spring means is deflected upward whereby relative movement of the arm to the connector disconnects the arm therefrom.

6. A connector between a windshield wiper arm and a windshield wiper blade assembly comprising a housing pivotally connected to the wiper blade, said housing having a top wall, parallel side walls and a bottom wall defining an area open in a direction facing away from said pivot connection, said bottom wall having a leading edge spaced rearwardly of the front edge of said top wall, an elongate spring member having a substantially flat body portion with an anchoring portion, an attaching portion, a retaining portion and a downturned end portion, said anchoring portion engaging the inside of said top wall for preventing forward movement of the spring member, said attaching portion being secured in the side walls of said housing near the front edge of said top wall with the retaining portion and downturned end portion being spring-urged toward the inside surface of said bottom wall, said body portion of the spring member having an opening formed in said attaching portion and adapted to receive an abutment on an end portion of the windshield wiper arm, and said retaining portion of the spring member urging the end portion of the arm against the inside surface of said bottom wall whereby the wiper arm is positively connected to said connector and said blade assembly.

7. In the connector of claim 6 wherein said attaching portion of the spring member has sidewardly projecting ears and the side walls of said housing have mating aligned grooves into which said ears project, and said anchoring portion of said spring resiliently abutting a rearwardly facing surface for urging said ears into abutment with the ends of said grooves whereby the spring member is secured in said housing.

8. A connector between a windshield wiper arm and a windshield wiper blade assembly comprising a housing connected to the wiper blade for pivoting in a plane perpendicular to the pivot axis of said housing, said housing having a top wall, parallel side walls and a bottom wall joined together to define an opening therebetween, the open end of said opening in the housing remote from said pivot axis having the front edge of the bottom wall spaced longitudinally rearward from the front edge of the top wall, an elongate spring member having an anchoring portion, an attaching portion, and a retaining portion with a downturned end portion, said attaching portion being secured in the side walls with the retaining portion being spring-urged downward with said downturned end portion in contact with the inside of said bottom wall remote from said front edge of said bottom wall, said attaching portion having an opening therein in which a lug on the straight end portion of the windshield wiper arm will resiliently nest for securing said wiper arm to said connector, and said wiper arm being removable from said connector by tilting the connector and blade perpendicular to the longitudinal extent of the wiper arm beyond the end of the wiper arm to pivot the connector about the front edge of the bottom wall of said connector against the force of the spring to disconnect the abutment from the opening whereby the wiper arm can be moved relative to the connector to disconnect one from the other.

* * * * *